(12) United States Patent
Khlat et al.

(10) Patent No.: US 12,526,636 B2
(45) Date of Patent: Jan. 13, 2026

(54) SELF-ORGANIZED MESH NETWORK

(71) Applicant: Qorvo US, Inc., Greensboro, NC (US)

(72) Inventors: Nadim Khlat, Cugnaux (FR); Eric Perraud, Plaisance du Touch (FR)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 18/706,457

(22) PCT Filed: Nov. 1, 2022

(86) PCT No.: PCT/US2022/048600
§ 371 (c)(1),
(2) Date: May 1, 2024

(87) PCT Pub. No.: WO2023/081158
PCT Pub. Date: May 11, 2023

(65) Prior Publication Data
US 2024/0422549 A1  Dec. 19, 2024

Related U.S. Application Data

(60) Provisional application No. 63/275,574, filed on Nov. 4, 2021.

(51) Int. Cl.
*H04L 29/06* (2006.01)
*H04W 12/50* (2021.01)
(Continued)

(52) U.S. Cl.
CPC ........... *H04W 12/50* (2021.01); *H04W 12/63* (2021.01); *H04W 84/18* (2013.01)

(58) Field of Classification Search
None
See application file for complete search history.

(56) References Cited

U.S. PATENT DOCUMENTS 2,872,673 A   2/1959   Pleasure
4,801,836 A   1/1989   Mariani
(Continued)

FOREIGN PATENT DOCUMENTS

EP      1016241 A2    7/2000
WO   2016/138483 A1   9/2016
WO   2021026657 A1   2/2021

OTHER PUBLICATIONS

Hoang et al., "A Cluster-Based Protocol for Self-Organizing UWB Wireless Ad Hoc Sensor Networks," Man and Cybernetics Systems, Oct. 11, 2009, pp. 317-322.
(Continued)

*Primary Examiner* — Jeffery L Williams
(74) *Attorney, Agent, or Firm* — Withrow & Terranova, P.L.L.C.

(57) ABSTRACT

A self-organized mesh network is disclosed. In a non-limiting example, the self-organized mesh network can be an ultra-wideband (UWB) based mesh network. Herein, the self-organized mesh network includes multiple node clusters, each anchored by a respective coordinating node. In an embodiment, the coordinating node can detect a secure node(s) and a secure bridge node(s) among the secure node(s) in a respective node cluster and establish secure communication links (e.g., based on UWB protocol) with the detected secure node(s) and secure bridge node(s). Further, through the detected secure bridge node(s), the coordinating node can further detect adjacent and non-adjacent node clusters. Accordingly, the coordinating node can establish secure communications with the detected adjacent and/or non-adjacent node clusters.

21 Claims, 8 Drawing Sheets

(51) Int. Cl.
*H04W 12/63* (2021.01)
*H04W 84/18* (2009.01)

(56) References Cited

U.S. PATENT DOCUMENTS

| | | | |
|---|---|---|---|
| 2005/0122944 A1* | 6/2005 | Kwon | H04L 12/4625 370/328 |
| 2005/0152305 A1* | 7/2005 | Ji | H04L 63/0428 370/328 |
| 2010/0159866 A1 | 6/2010 | Fudge et al. | |
| 2011/0200026 A1* | 8/2011 | Ji | H04L 63/0884 370/338 |
| 2015/0081040 A1* | 3/2015 | Apte | G01S 5/16 700/9 |
| 2015/0350027 A1* | 12/2015 | Raissinia | H04L 41/12 455/517 |
| 2016/0344574 A1 | 11/2016 | Choi et al. | |
| 2017/0187415 A1 | 6/2017 | Choi | |
| 2018/0009112 A1* | 1/2018 | Williams | G01S 5/0289 |
| 2019/0090191 A1 | 3/2019 | Liu et al. | |
| 2019/0162843 A1* | 5/2019 | Jiang | H04W 24/10 |
| 2019/0306811 A1 | 10/2019 | Balakrishnan et al. | |
| 2020/0249351 A1 | 8/2020 | Chen et al. | |
| 2023/0266431 A1* | 8/2023 | Perraud | G01S 13/0209 455/456.1 |
| 2024/0422549 A1* | 12/2024 | Khlat | H04W 12/55 |

OTHER PUBLICATIONS

Salonidis et al., "Distributed Topology Construction of Bluetooth Personal Area Networks," Proceedings of IEEE Infocom 2001, Apr. 22, 2001, vol. 3, pp. 1577-1586.
International Search Report and Written Opinion for PCT/US2022/048600, mailed Feb. 1, 2023, 17 pages.

* cited by examiner

```
                    ┌─────────────────────────────────────────────────────────────┐
                    │ TRANSMIT A RANGING CONTROL MESSAGE (38) AND RECEIVE A        │
              200   │ PLURALITY OF RANGING RESPONSE MESSAGES (40) FROM A           │
                    │ PLURALITY OF WIRELESS NODES (16), RESPECTIVELY               │
                    │                           202                                │
                    └─────────────────────────────────────────────────────────────┘
                                              │
                                              ▼
                    ┌─────────────────────────────────────────────────────────────┐
                    │ DETERMINE ONE OR MORE SECURE NODES (16A_S, 16A_SB, 16B_S,    │
                    │ 16B_SB, 16C_S1, 16C_S2) AMONG THE PLURALITY OF WIRELESS     │
                    │ NODES (16) BASED ON THE PLURALITY OF RECEIVED RANGING       │
                    │ RESPONSE MESSAGES (40)                                       │
                    │                           204                                │
                    └─────────────────────────────────────────────────────────────┘
                                              │
                                              ▼
                    ┌─────────────────────────────────────────────────────────────┐
                    │ TRANSMIT A BRIDGE CAPABILITY REQUEST (42) TO EACH OF THE     │
                    │ ONE OR MORE DETERMINED SECURE NODES (16A_S, 16A_SB, 16B_S,  │
                    │ 16B_SB, 16C_S1, AND 16C_S2, 16A, 16A_SB,S, 16B_SB) AND      │
                    │ RECEIVE ONE OR MORE BRIDGE CAPABILITY RESPONSES (44) FROM   │
                    │ THE ONE OR MORE DETERMINED SECURE NODES (16A_S, 16A_SB,     │
                    │ 16B_S, 16B_SB, 16C_S1, AND 16C_S2, 16A, 16A_SB,S, 16B_SB),  │
                    │ RESPECTIVELY                                                 │
                    │                           206                                │
                    └─────────────────────────────────────────────────────────────┘
                                              │
                                              ▼
                    ┌─────────────────────────────────────────────────────────────┐
                    │ DETERMINE AT LEAST ONE SECURE BRIDGE NODE (16A_SB, 16B_SB),  │
                    │ AMONG THE ONE OR MORE SECURE NODES (16A_S, 16A_SB, 16B_S,   │
                    │ 16B_SB, 16C_S1, AND 16C_S2, 16A, 16A_SB,S, 16B_SB), BASED   │
                    │ ON THE ONE OR MORE RECEIVED BRIDGE CAPABILITY RESPONSES (44)│
                    │                           208                                │
                    └─────────────────────────────────────────────────────────────┘
```

*FIG. 8*

SELF-ORGANIZED MESH NETWORK

RELATED APPLICATIONS

This application is a 35 USC 371 national phase filing of International Application No. PCT/US2022/048600, filed Nov. 1, 2022, which claims the benefit of U.S. provisional patent application Ser. No. 63/275,574, filed on Nov. 4, 2021, the disclosure of which is hereby incorporated herein by reference in its entirety.

FIELD OF THE DISCLOSURE

The technology of the disclosure relates generally to a self-organized mesh network and, more specifically, a self-organized mesh network supporting ultra-wideband (UWB) communications.

BACKGROUND

Ultra-wideband (UWB) is an Institute of Electrical and Electronic Engineers (IEEE) 802.15.4a/z standard technology optimized for secure micro-location-based applications. It is capable of measuring distance and location with extended range (e.g., up to 70 meters) and unprecedented accuracy (e.g., within a few centimeters), compared to such traditional technologies such as Wi-Fi and Bluetooth. In addition to location capability, UWB can also offer a data communication pipe of 27+Mbps. As such, UWB technology is being widely adopted in today's new smartphones and smart gadgets to enable spatial awareness in places where global positioning service (GPS) based positioning service is unavailable or unreliable and/or for fast and secure data collection from various sensors.

UWB based positioning service is enabled by transmitting a pseudo-random sequence of UWB pulses from a UWB anchor (e.g., smartphone) to a UWB tag (e.g., a sensor), or vice-versa, and calculating the time it takes the pseudo-random sequence of UWB pulses to travel between the UWB anchor and the UWB tag and an angle-of-arrival (AoA) of the UWB pulse relative to the UWB anchor. The UWB pulse is typically 2 nanoseconds (ns) wide and has clean edges, thus making it highly immune to reflected signals (e.g., multipath) and allowing a precise determination of arrival time and distance in a multipath radio environment (e.g., an indoor environment). By piggybacking data to the frame of UWB pulses, UWB opens the door for the UWB anchor to communicate with the UWB tag directly (e.g., peer to peer) and/or indirectly (e.g., multi-hop relay). Similarly, UWB based ranging service is enabled by a two-way exchange of UWB frames between a UWB initiator and an UWB responder, where the UWB frames convey the pseudo-random sequence of UWB pulses and may also carry a payload with the measured time-of-arrival (ToA) of the UWB frames, which may be used to compute the distance between the UWB initiator and the UWB responder.

SUMMARY

Embodiments of the disclosure relate to a self-organized mesh network. In a non-limiting example, the self-organized mesh network can be an ultra-wideband (UWB) based mesh network. Herein, the self-organized mesh network includes multiple node clusters, each anchored by a respective coordinating node. In an embodiment, the coordinating node can detect a secure node(s) and a secure bridge node(s) among the secure nodes in a respective node cluster and establish secure communication links (e.g., based on UWB protocol) with the detected secure node(s) and secure bridge node(s). Further, through the detected secure bridge node(s), the coordinating node can further detect adjacent and non-adjacent node clusters. Accordingly, the coordinating node can establish secure communications with the detected adjacent and/or non-adjacent node clusters.

In one aspect, a coordinating node of a node cluster in a self-organized mesh network is provided. The coordinating node includes a processing circuit. The processing circuit is configured to transmit a ranging control message and receive multiple ranging response messages from multiple wireless nodes, respectively. The processing circuit is also configured to determine one or more secure nodes among the multiple wireless nodes based on the multiple received ranging response messages. The processing circuit is also configured to transmit a bridge capability request to each of the one or more determined secure nodes and receive one or more bridge capability responses from the one or more determined secure nodes, respectively. The processing circuit is also configured to determine at least one secure bridge node among the one or more secure nodes based on the one or more received bridge capability responses.

In another aspect, a self-organized mesh network is provided. The self-organized mesh network includes multiple node clusters each having a respective one of multiple coordinating nodes. The respective one of the multiple coordinating nodes includes a processing circuit. The processing circuit is configured to transmit a ranging control message in the respective one of the multiple node clusters and receive multiple ranging response messages from multiple wireless nodes, respectively. The processing circuit is also configured to determine one or more secure nodes among the multiple wireless nodes based on the multiple received ranging response messages. The processing circuit is also configured to transmit a bridge capability request to each of the one or more determined secure nodes and receive one or more bridge capability responses from the one or more determined secure nodes, respectively. The processing circuit is also configured to determine at least one secure bridge node among the one or more secure nodes based on the one or more received bridge capability responses.

In another aspect, a method for operating a self-organized mesh network is provided. The method includes transmitting a ranging control message and receiving multiple ranging response messages from multiple wireless nodes, respectively. The method also includes determining one or more secure nodes among the multiple wireless nodes based on the multiple received ranging response messages. The method also includes transmitting a bridge capability request to each of the one or more determined secure nodes and receiving one or more bridge capability responses from the one or more determined secure nodes, respectively. The method also includes determining at least one secure bridge node among the one or more secure nodes based on the one or more received bridge capability responses.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 8 is a flowchart of an exemplary process for operating the self-organized mesh network of FIG. 1.

DETAILED DESCRIPTION

Figure 1:
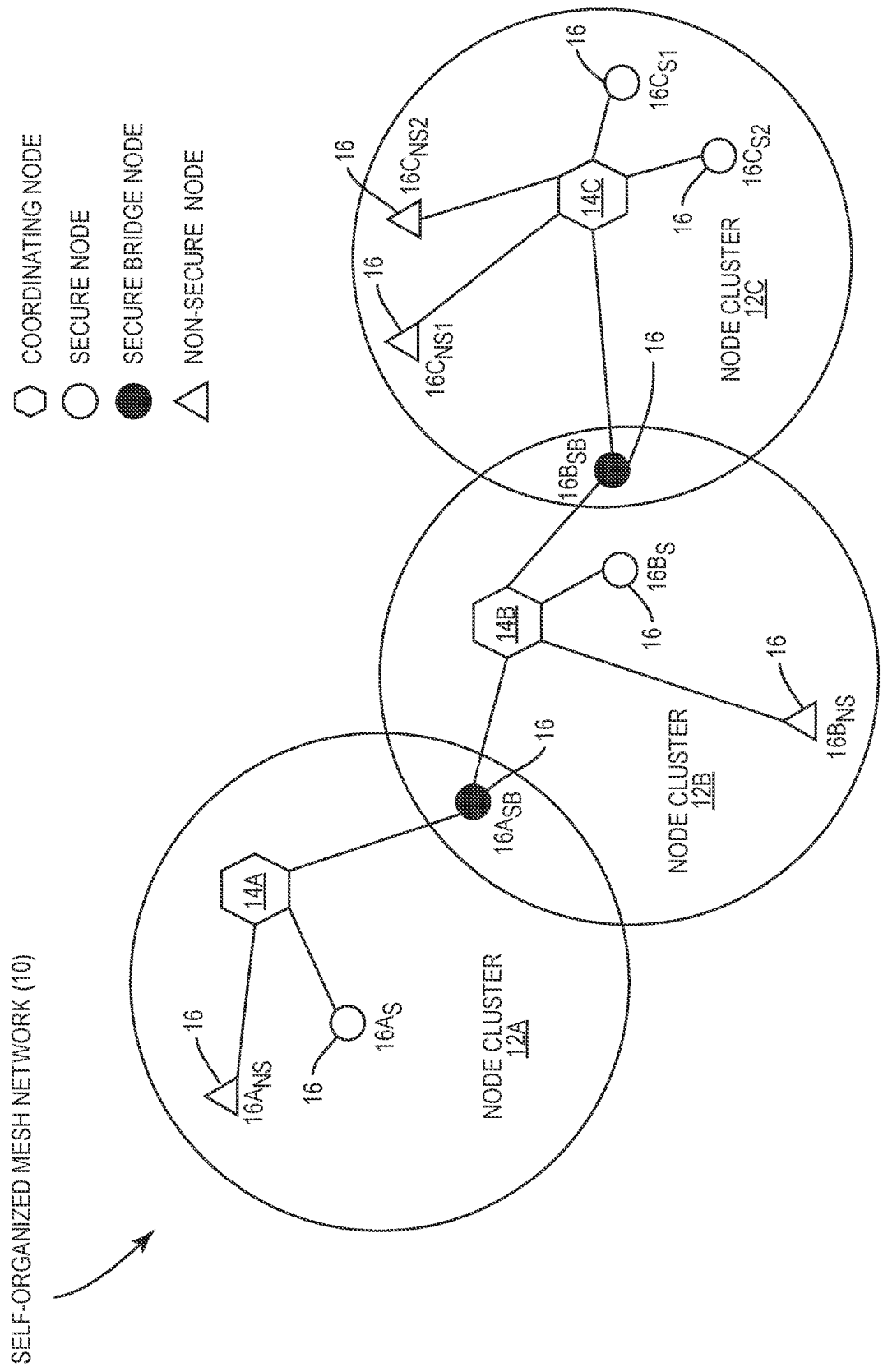
FIG. 1 is a schematic diagram of an exemplary self-organized mesh network configure according to an embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to a self-organized mesh network. In a non-limiting example, the self-organized mesh network can be an ultra-wideband (UWB) based mesh network. Herein, the self-organized mesh network includes multiple node clusters, each anchored by a respective coordinating node. In an embodiment, the coordinating node can detect a secure node(s) and a secure bridge node(s) among the secure node(s) in a respective node cluster and establish secure communication links (e.g., based on UWB protocol) with the detected secure node(s) and secure bridge node(s). Further, through the detected secure bridge node(s), the coordinating node can further detect adjacent and non-adjacent node clusters. Accordingly, the coordinating node can establish secure communications with the detected adjacent and/or non-adjacent node clusters.

FIG. 1 is a schematic diagram of an exemplary self-organized mesh network 10 configured according to an embodiment of the present disclosure. The self-organized mesh network 10 includes multiple node clusters 12A, 12B, 12C. In an example, the node cluster 12A overlaps with the node cluster 12B. As such, the node clusters 12A and 12B are said to be adjacent node clusters. Similarly, the node clusters 12B and 12C are adjacent node clusters as well since the node cluster 12B also overlaps with the node cluster 12C. In contrast, the node clusters 12A and 12C are said to be non-adjacent node clusters because the node clusters 12A and 12C do not overlap each other.

In the context of the present disclosure, the self-organized mesh network 10 is an UWB-based mesh network. In this regard, each of the node clusters 12A, 12B, 12C is anchored by a respective one of multiple coordinating nodes 14A, 14B, 14C (e.g., smartphone) and includes one or more wireless nodes 16 (e.g., UWB tags, UWB-capable smartphones, UWB repeaters, etc.).

More specifically, each of the coordinating nodes 14A, 14B, 14C is configured to detect the wireless nodes 16 to form a respective one of the node clusters 12A, 12B, 12C and communicate with the wireless nodes 16 in the respective one of the node clusters 12A, 12B, 12C based on a centralized topology (a.k.a. a tree-like topology). As such, each of the coordinating nodes 14A, 14B, 14C is configured to initiate communications with the wireless nodes 16 in the respective one of the node clusters 12A, 12B, 12C.

Herein, the self-organized mesh network 10 is said to be self-organized because each of the node clusters 12A, 12B, 12C is dynamically formed, for example, based on periodic ranging rounds performed by the coordinating nodes 14A, 14B, 14C, as opposed to being configured based on a static coverage map. In this regard, the size of the node clusters 12A, 12B, 12C may be determined by the communication distance of the coordinating nodes 14A, 14B, 14C, which can vary depending on such factors as transmission power, antenna type (e.g., directional or omni-direction), and/or antenna orientation. Moreover, when any of the coordinating nodes 14A, 14B, 14C moves, some of the previous wireless nodes 16 may become out of the communication distance, while some other wireless nodes 16 may come within the communication distance. Similarly, any of the wireless nodes 16 may also move out of a respective RF coverage of any of the coordinating nodes 14A, 14B, 14C and into a respective RF coverage of any other one of the coordinating nodes 14A, 14B, 14C. As a result, each of the node clusters 12A, 12B, 12C may expand or shrink from time to time. As such, each of the coordinating nodes 14A, 14B, 14C is configured to conduct the ranging rounds periodically.

Herein, the wireless nodes 16 in each of the node clusters 12A, 12B, 12C are further categorized into non-secure nodes, secure nodes, and secure bridge nodes. In the context of the present disclosure, a secure node is one of the wireless nodes 16 in any of the node clusters 12A, 12B, 12C, which is located at a distance within an expected distance from a respective one of the coordinating nodes 14A, 14B, 14C and at an expected position having an angle-of-arrival (AoA) within an expected AoA relative to the respective one of the coordinating nodes 14A, 14B, 14C. The set of secure nodes of any of the node clusters 12A, 12B,12C may vary if a wireless node 16 moves out of the expected distance or the expected position or comes back to the expected distance or the expected position. A secure bridge node, on the other hand, refers to a secure node in more than one of the node clusters 12A, 12B, 12C. In contrast, a non-secure node is one of the wireless nodes 16 in any of the node clusters 12A, 12B, 12C, which is located at a distance falling outside the expected distance from a respective one of the coordinating nodes 14A, 14B, 14C and/or having an AoA falling outside the expected AoA relative to the respective one of the coordinating nodes 14A, 14B, 14C. In an embodiment, each of the coordinating nodes 14A, 14B, 14C may be configured to only communicate with the secure nodes and the secure bridge nodes among the wireless nodes 16 to thereby make the self-organized mesh network 10 a secured mesh network.

In the example illustrated in FIG. 1, the node cluster 12A includes a non-secure node $16A_{NS}$, a secure node $16A_S$, and a secure bridge node $16A_{SB}$, the node cluster 12B includes a non-secure node $16B_{NS}$, a secure node $16B_S$, and a pair of secure bridge nodes $16A_{SB}$, $16B_{SB}$, and the node cluster 120 includes a pair of non-secure nodes $16C_{NS1}$, $16C_{NS2}$, a pair of secure nodes $16C_{S1}$, $16C_{S2}$, and a secure bridge node $16B_{SB}$. More specifically, the secure bridge node $16A_{SB}$ is a secure node in both the node clusters 12A and 12B, while the secure bridge node $16B_{SB}$ is a secure node in both the node clusters 12B and 12C.

In this regard, the secure bridge node $12A_{SB}$ can function as a communication bridge between the coordinating nodes 14A and 14B. Likewise, the secure bridge node $12B_{SB}$ can function as a communication bridge between the coordinating nodes 14B and 14C. Moreover, the secure bridge nodes $16A_{SB}$ and $16B_{SB}$ can also bridge communications between the coordinating nodes 14A and 14C, despite that the node clusters 12A and 12C are non-adjacent node clusters.

Figure 2:
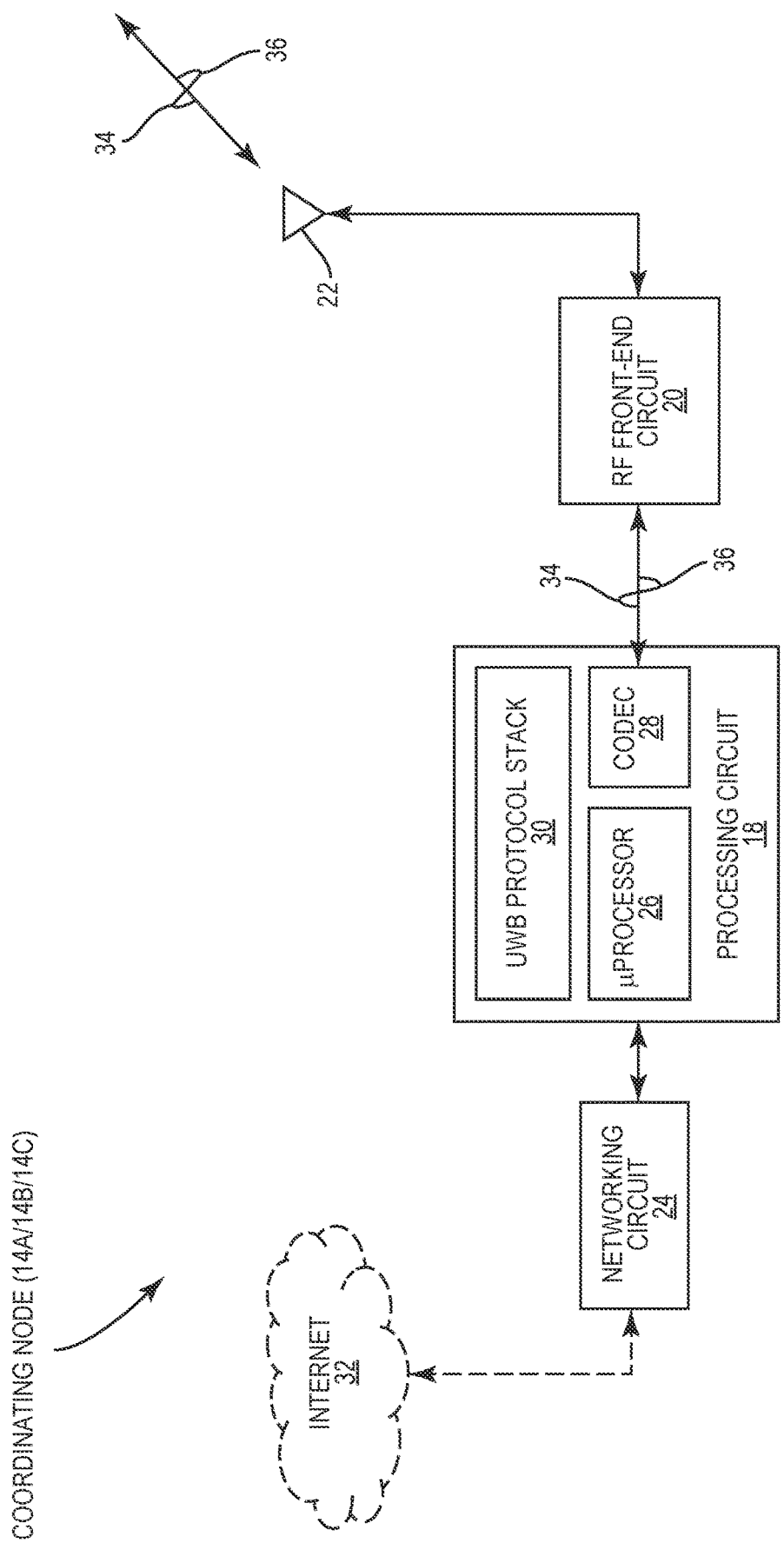
FIG. 2 is a schematic diagram providing an exemplary illustration of a coordinating node(s) in the self-organized mesh network of FIG. 1.

FIG. 2 is a schematic diagram providing an exemplary illustration of the coordinating nodes 14A, 14B, 14C in the self-organized mesh network 10 of FIG. 1. Common elements between FIGS. 1 and 2 are shown therein with common element numbers and will not be re-described herein.

Herein, each of the coordinating nodes 14A, 14B, 14C can be configured to include a processing circuit 18, a radio frequency (RF) frontend circuit 20, which is coupled to a transmit/receive antenna 22, and a networking circuit 24. The networking circuit 24 may provide higher layer communication protocols, such as Internet Protocol (IP), to thereby enable connectivity to an Internet 32.

The processing circuit 18 includes a microprocessor 26 (e.g., a digital signal processor) and an encoding/decoding circuit 28 (denoted as "CODEC"). In an embodiment, the processing circuit 18 further includes an UWB protocol stack 30 that implements UWB physical (PHY) layer and medium access control (MAC) layer protocols as defined in, for example, the Institute of Electrical and Electronic Engineers (IEEE) 802.15.4a/z standard. Accordingly, the encoding/decoding circuit 28 can encode an outgoing UWB signal 34 for transmission via the RF frontend circuit 20 and decode an incoming UWB signal 36 received via the RF frontend circuit 20.

Figure 3:
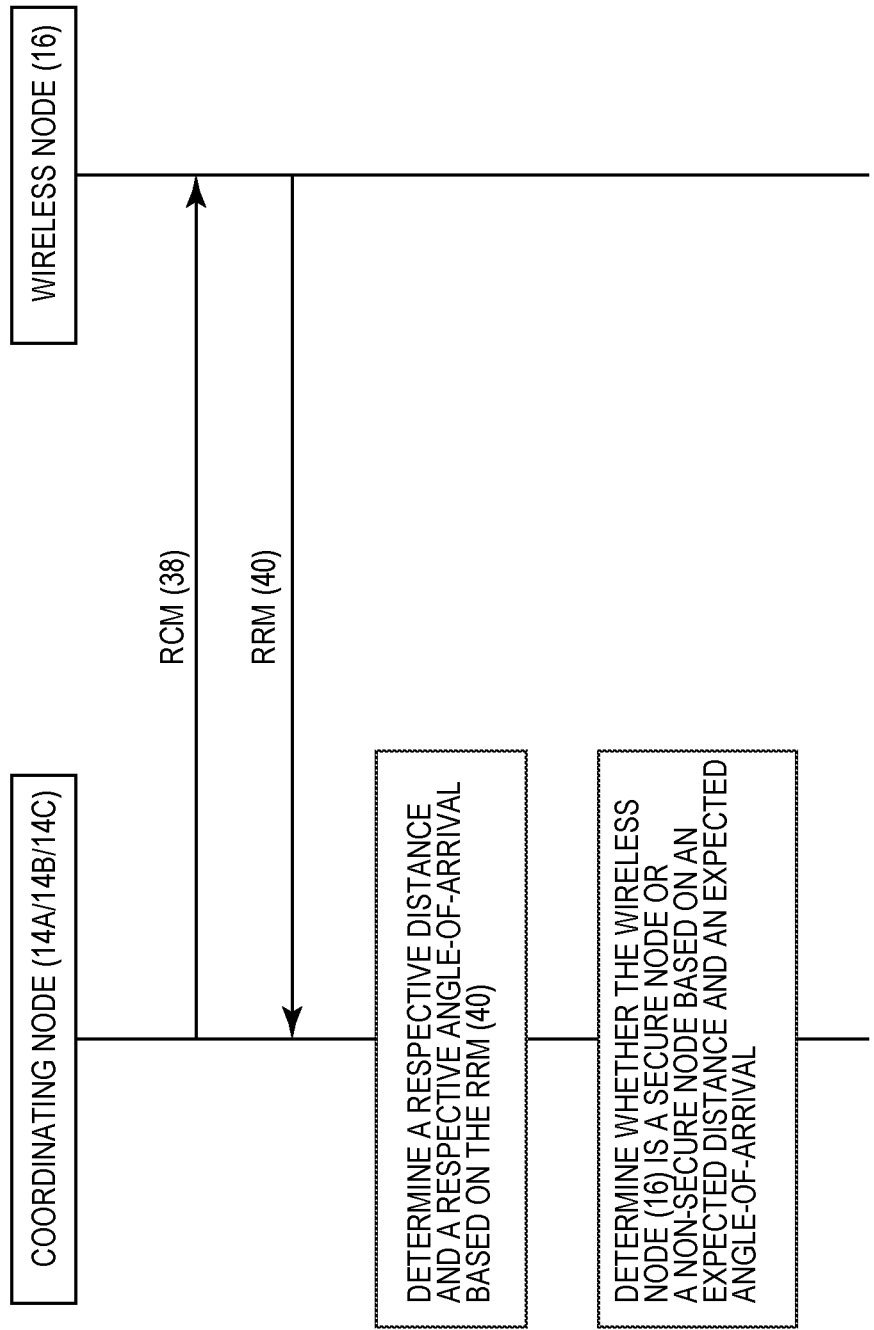
FIG. 3 is a signal flow diagram providing an exemplary illustration of a periodic ranging round performed by the coordinating node(s) of FIG. 2 to detect a secure node(s) in the self-organized mesh network of FIG. 1.

In an embodiment, each of the coordinating nodes 14A, 14B, 14C can be configured to determine whether any of the wireless nodes 16 is a secure node or a non-secure node through a periodic ranging round. FIG. 3 is a signal flow diagram providing an exemplary illustration of the periodic ranging round performed by each of the coordinating nodes 14A, 14B, 14C.

Herein, each of the coordinating nodes 14A, 14B, 14C is configured to transmit a ranging control message (RCM) 38 (e.g., a UWB RCM) toward any of the wireless nodes 16. In response to receiving the RCM 38, each of the wireless nodes 16 sends back a respective ranging response message (RRM) 40 (e.g., a UWB RRM). Based on the respective RRM 40 received from each of the wireless nodes 16, the processing circuit 18 can measure a respective distance and/or a respective AoA relative to the respective one of the wireless nodes 16. Accordingly, the processing circuit 18 can determine whether the respective one of the wireless nodes 16 is a secure node or a non-secure node by comparing the measured distance against the expected distance and/or comparing the measured AoA against the expected AoA. By performing the ranging round, the coordinating nodes 14A, 14B, 14C in the self-organized mesh network 10 of FIG. 1 are able to detect the secure nodes $16A_S$, $16A_{SB}$, $16B_S$, $16B_{SB}$, $16C_{S1}$, and $16C_{S2}$ among the wireless nodes 16.

Notably, since the wireless nodes 16 can move around from time to time, the measured distance and/or AoA relative to each of the wireless nodes 16 can change accordingly. As a result, a previously determined secure node can become a non-secure node, and vice versa. In this regard, each of the coordinating nodes 14A, 14B, 14C may need to transmit the RCM 38 periodically to keep the list of secure nodes afresh.

In an embodiment, each of the coordinating nodes 14A, 14B, 140 may determine a predicted distance and/or a predicted AoA for each of the wireless nodes 16. In this regard, the wireless node 16 can remain as a secure node or a non-secure node as long as the change in location and/or AoA is within the predicted distance and/or the predicted AoA.

Figure 4:
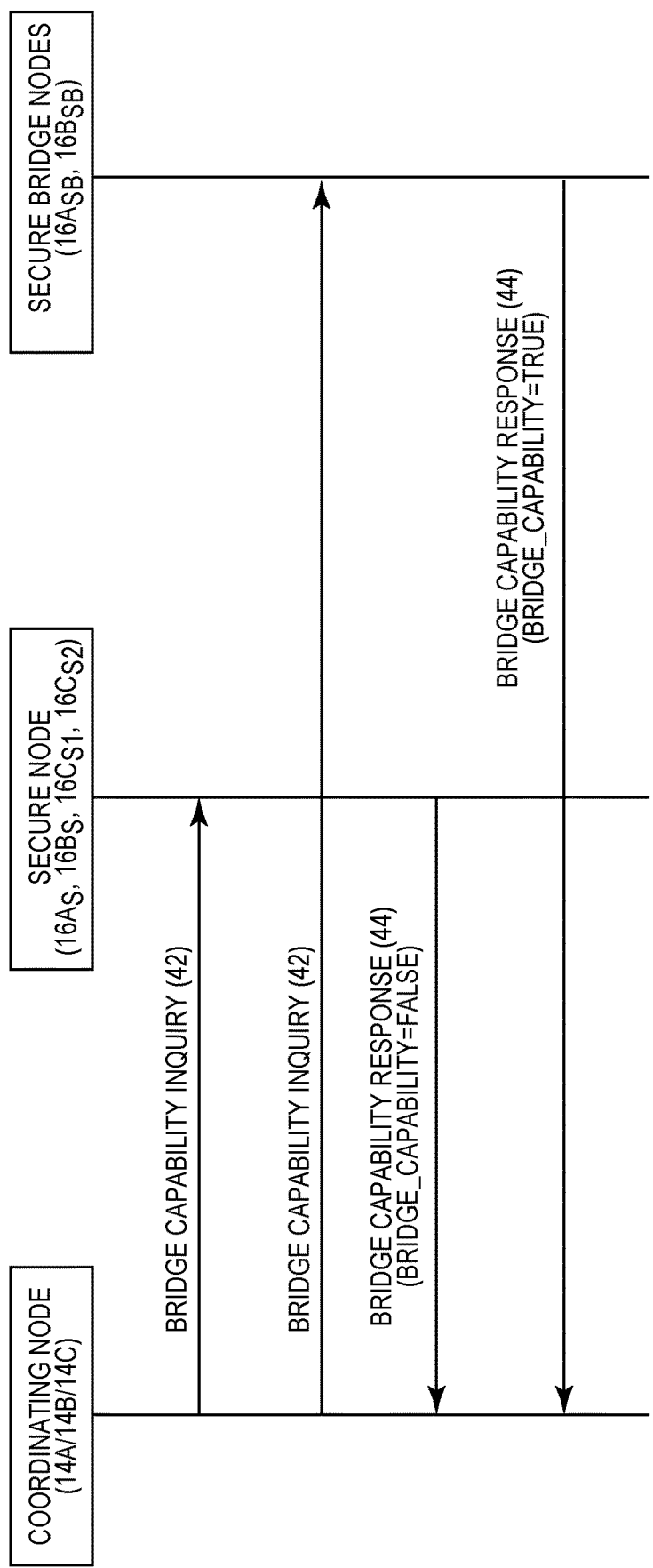
FIG. 4 is a signal flow diagram providing an exemplary illustration of a procedure performed by the coordinating node(s) of FIG. 2 to determine a secure bridge node(s) among the secure node(s) determined during the periodic ranging round of FIG. 3.

Upon determining the secure nodes $16A_S$, $16A_{SB}$, $16B_S$, $16B_{SB}$, $16C_{S1}$, and $16C_{S2}$, the processing circuit 18 in FIG. 2 is configured to further determine the secure bridge nodes $16A_{SB}$ and $6B_{SB}$ among the determined secure nodes $16A_S$, $16A_{SB}$, $16B_S$, $16B_{SB}$, $16C_{S1}$, and $16C_{S2}$. FIG. 4 is a signal flow diagram providing an exemplary illustration of a procedure for determining the secure bridge nodes $16A_{SB}$ and $6B_{SB}$ among the determined secure nodes $16A_S$, $16A_{SB}$, $16B_S$, $16B_{SB}$, $16C_{S1}$, and $16C_{S2}$.

In an embodiment, each of the coordinating nodes 14A, 14B, 140 is configured to transmit a bridge capability inquiry 42 toward the determined secure nodes $16A_S$, $16A_{SB}$, $16B_S$, $16B_{SB}$, $16C_{S1}$, and $16C_{S2}$. In a non-limiting example, the bridge capability inquiry 42 can be piggybacked on the ROM 38, e.g., as an information element (IE). In response to receiving the bridge capability inquiry 42, each of the determined secure nodes $16A_S$, $16A_{SB}$, $16B_S$, $16B_{SB}$, $16C_{S1}$, and $16C_{S2}$ sends a bridge capability response 44, which can be piggybacked on the RRM 40, e.g., as another IE. In an embodiment, the bridge capability response 44 can include a bridge capability indication (denoted as "Bridge_Capability") to explicitly indicate whether any of the secure nodes $16A_S$, $16A_{SB}$, $16B_S$, $16B_{SB}$, $16C_{S1}$, and $16C_{S2}$ can act as a secure bridge node to provide a secure connection to an adjacent node cluster in the self-organized mesh network 10. Specifically, the secure nodes $16A_S$, $16B_S$, $16C_{S1}$, and $16C_{S2}$ send the bridge capability response 44 with the bridge capability indication set to "False," while the secure nodes $16A_{SB}$ and $16B_{SB}$ send the bridge capability response 44 with the bridge capability indication set to "True." Accordingly, the coordinating nodes 14A, 14B, 140 can determine the secure bridge nodes $16A_{SB}$ and $16B_{SB}$ in the self-organized mesh network 10.

Figure 5:
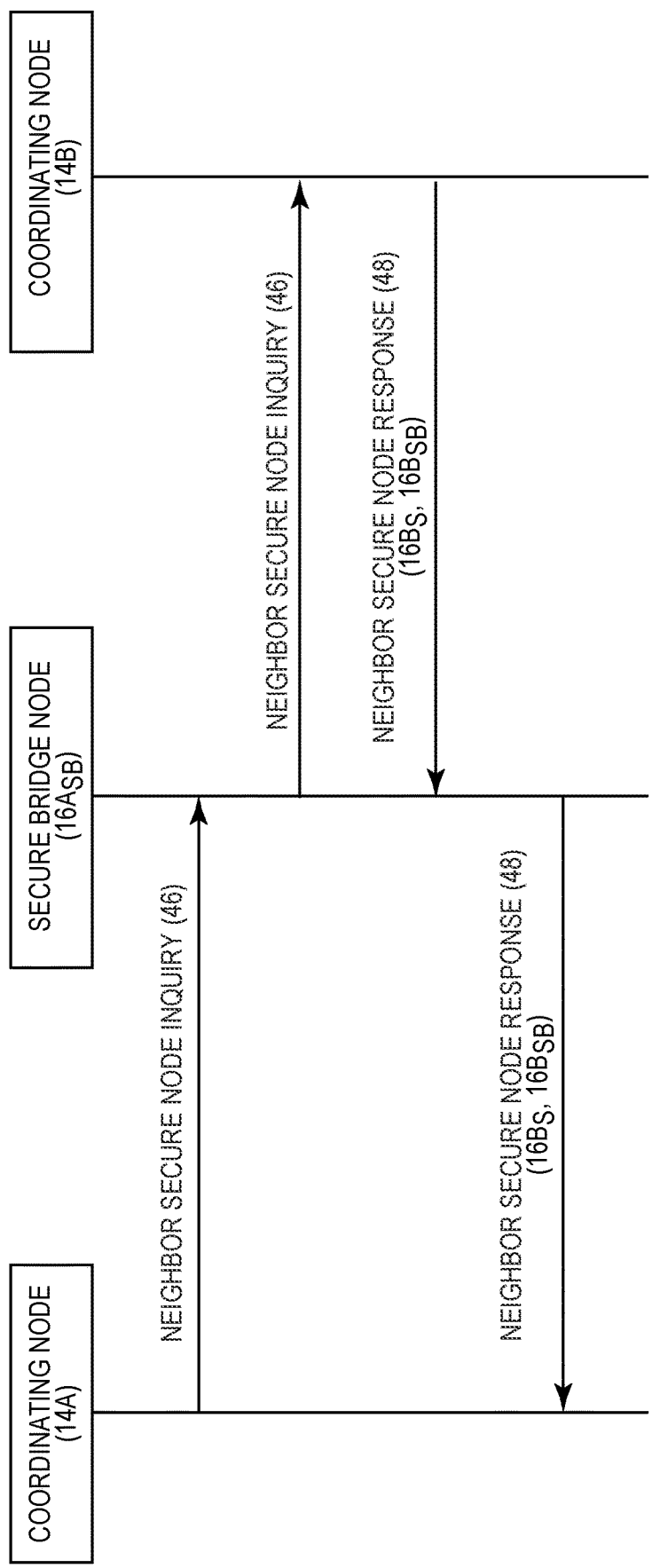
FIG. 5 is a signal flow diagram providing an exemplary illustration of a procedure performed by the coordinating node(s) of FIG. 2 to obtain a list of adjacent secure nodes from an adjacent node cluster(s)

Through the determined secure bridge nodes $16A_{SB}$ and $16B_{SB}$, the coordinating nodes 14A, 14B, 14C can communicate with each other to exchange further information to enable additional networking functionalities. In one embodiment, each of the coordinating nodes 14A, 14B, 14C can obtain a list of secure nodes in an adjacent node cluster so as to establish secure communications with the list of secure nodes in the adjacent node cluster. In this regard, FIG. 5 is a signal flow diagram providing an exemplary illustration of a procedure for obtaining a list of adjacent secure nodes from an adjacent one of the node clusters 12A, 12B, 12C in the self-organized mesh network 10 of FIG. 1.

In an embodiment, the coordinating node 14A in the node cluster 12A can send a neighbor secure node inquiry 46 to the coordinating node 14B in the node cluster 12B. In a non-limiting example, the neighbor secure node inquiry 46 can also be sent as an IE in the RCM 38. The neighbor secure node inquiry 46 requests the coordinating node 14B (a.k.a. adjacent coordinating node) to provide a list of adjacent secure nodes in the node cluster 12B. The neighbor secure node inquiry 46 is received by the secure bridge node $16A_{SB}$ and forwarded to the coordinating node 14B.

In response, the coordinating node 14B sends a neighbor secure node response 48 to the secure bridge node $16A_{SB}$. In a non-limiting example, the neighbor secure node response 48 can also be sent as an IE in the RRM 40. The neighbor secure node response 48 includes the list of adjacent secure nodes $16B_S$ and $16B_{SB}$ in the node cluster 12B. The secure bridge node $16A_{SB}$, in turn, forwards the neighbor secure node response 48 to the coordinating node 14A.

Similarly, the coordinating node 14B can obtain a list of the secure nodes in the node cluster 12A and 12C based on the neighbor secure node inquiry 46 and the neighbor secure node response 48. Likewise, the coordinating node 14C can obtain a list of the secure nodes in the node cluster 12B based on the neighbor secure node inquiry 46 and the neighbor secure node response 48.

Figure 6:
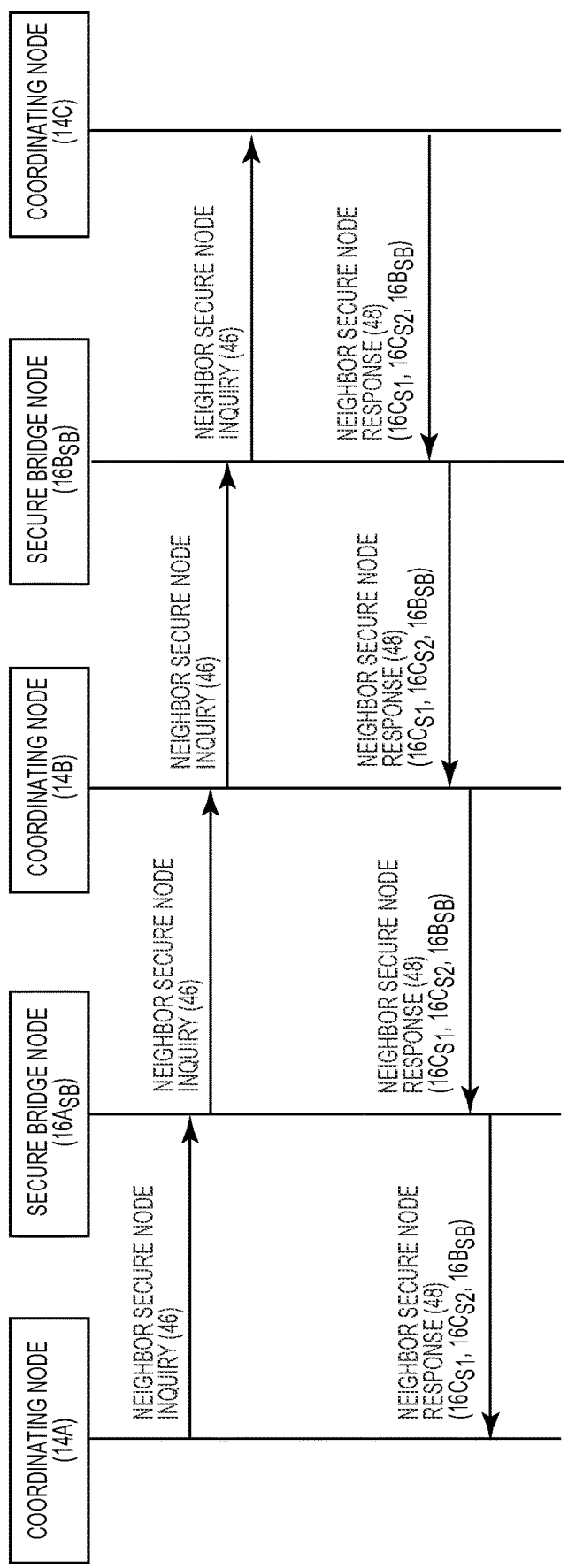
FIG. 6 is a signal flow diagram providing an exemplary illustration of a procedure performed by the coordinating node(s) of FIG. 2 to obtain a list of non-adjacent secure nodes from a non-adjacent node cluster(s)

Using the neighbor secure node inquiry 46 and the neighbor secure node response 48, the coordinating node 14A in the node cluster 12A can also obtain a list of non-adjacent secure nodes from the non-adjacent node cluster 12C. In this regard, FIG. 6 is a signal flow diagram providing an exemplary illustration of a procedure for obtaining a list of non-adjacent secure nodes from a non-adjacent one of the node clusters 12A, 12B, 12C in the self-organized mesh network 10 of FIG. 1.

Herein, the coordinating node 14A sends the neighbor secure node inquiry 46 toward the secure bridge node $16A_{SB}$, which forwards the neighbor secure node inquiry 46 to the coordinating node 14B in the node cluster 12B. The coordinating node 14B then forwards the neighbor secure node inquiry 46 toward the secure bridge node $16B_{SB}$, which then forwards the neighbor secure node inquiry 46 to the coordinating node 14C (a.k.a. non-adjacent coordinating node) in the node cluster 12C that is non-adjacent to the node cluster 12A.

In response to receiving the neighbor secure node inquiry 46, the coordinating node 14C assembles a list of non-adjacent secure nodes $16C_{S1}$, $16C_{S2}$, $16B_{SB}$ in the neighbor secure node response 48 and provides the neighbor secure node response 48 to the secure bridge node $16B_{SB}$. The secure bridge node $16B_{SB}$ then forwards the neighbor secure node response 48 to the coordinating node 14B, which then forwards the neighbor secure node response 48 toward the secure bridge node $16A_{SB}$. In a non-limiting example, the coordinating node 14B can forward the list of secure nodes of the node cluster 12C together with a respective list of secure nodes in the node cluster 12B but are not among the secure nodes of the node cluster 12C (e.g., $16B_S$ and $16A_{SB}$). The secure bridge node $16A_{SB}$, in turn, forwards the neighbor secure node response 48 to the coordinating node 14A. The coordinating node 14C, on the other hand, may also obtain a list of the secure nodes in the node cluster 12A through the procedure described above.

Upon discovering the secure nodes $16A_S$, $16A_{SB}$, $16B_S$, $16B_{SB}$, $16C_{S1}$, and $16C_{S2}$ in the node clusters 12A, 12B, 12C, each of the coordinating nodes 14A, 14B, 14C can build a full map of secure nodes in the self-organized mesh network 10 of FIG. 1. In an embodiment, each of the coordinating nodes 14A, 14B, 14C may repeat the procedures as described in FIGS. 3-6 periodically to update the full map of the secure nodes.

Accordingly, each of the coordinating nodes 14A, 14B, 14C can establish a secure communication route(s) with any of the secure nodes $16A_S$, $16A_{SB}$, $16B_S$, $16B_{SB}$, $16C_{S1}$, and $16C_{S2}$ in any of the node clusters 12A, 12B, 12C based on the full map of secure nodes. For example, each of the coordinating nodes 14A, 14B, 14C can receive data from the Internet 32 that is destined to any of the secure nodes $16A_S$, $16A_{SB}$, $16B_S$, $16B_{SB}$, $16C_{S1}$, and $16C_{S2}$. Accordingly, each of the coordinating nodes 14A, 14B, 14C can determine a best-possible communication route to the destined secure node. Notably, such a best-possible communication route can be determined based on any traffic routing algorithms.

In one embodiment, for critical communications, each of the coordinating nodes 14A, 14B, 14C may determine one primary communication route and a backup communication route for the destined secure node to help provide a layer of redundancy. In addition, each of the coordinating nodes 14A, 14B, 14C may monitor link quality (e.g., based on signal-to-noise ratio and/or packet error rate) on an ongoing basis to select a secure route for a desired reliability level. Each of the coordinating nodes 14A, 14B, 14C may also select a secure route to include a certain number of the secure nodes $16A_S$, $16A_{SB}$, $16B_S$, $16B_{SB}$, $16C_{S1}$, and $16C_{S2}$ in accordance with a latency budget. In an embodiment, each of the coordinating nodes 14A, 14B, 14C may request the secure nodes $16A_S$, $16A_{SB}$, $16B_S$, $16B_{SB}$, $16C_{S1}$, and $16C_{S2}$ to periodically report a link quality metric to help determine the link quality.

In an embodiment, each of the coordinating nodes 14A, 14B, 14C can be a type of user element, such as a smartphone. In this regard, FIG. 7 is a schematic diagram of an exemplary user element 100, which can be provided in the self-organized mesh network 10 of FIG. 1 to function as any of the coordinating nodes 14A, 14B, 14C.

Figure 7:
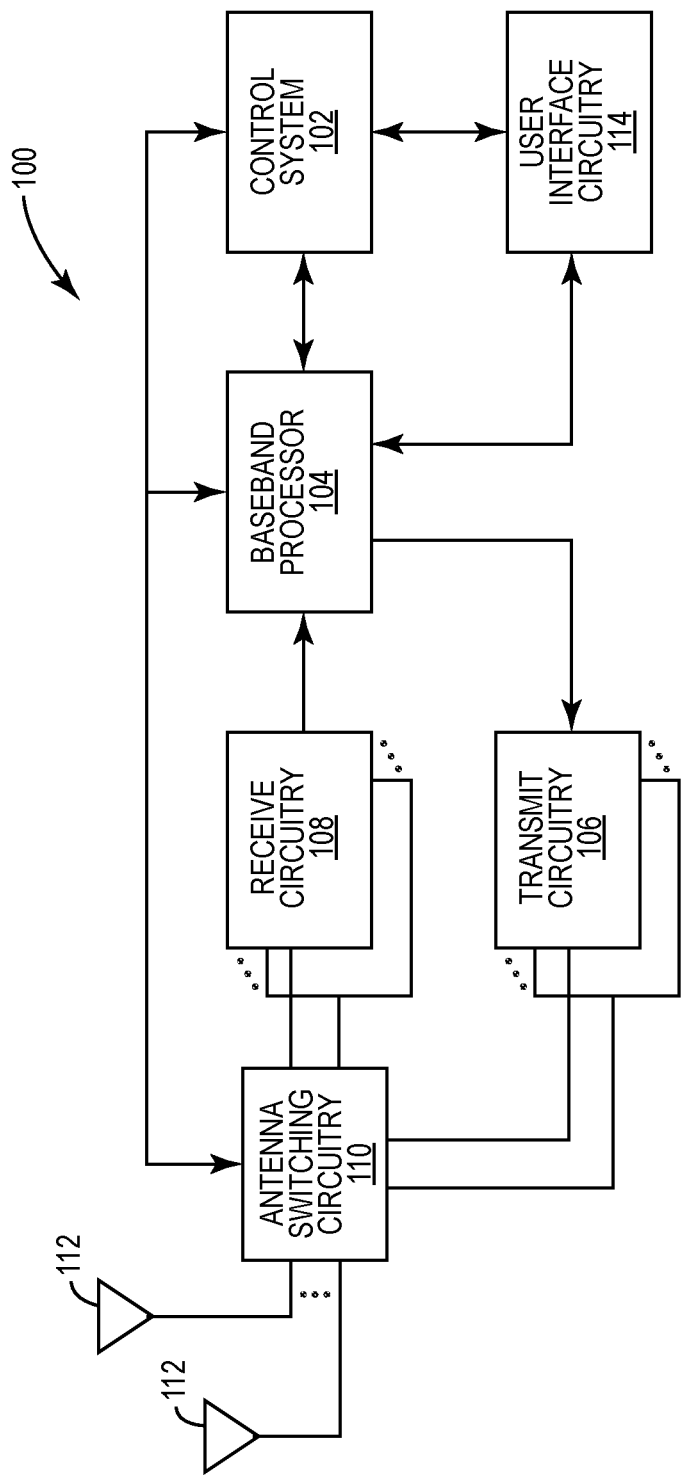
FIG. 7 is a schematic diagram of an exemplary user element, which can be provided in the self-organized mesh network of FIG. 1 to function as a coordinating node.

With reference to FIG. 7, the concepts described above may be implemented in various types of the user element 100, such as mobile terminals, smart watches, tablets, computers, navigation devices, access points, and like wireless communication devices that support wireless communications, such as cellular, wireless local area network (WLAN), Bluetooth, and near field communications. The user element 100 will generally include a control system 102, a baseband processor 104, transmit circuitry 106, receive circuitry 108, antenna switching circuitry 110, multiple antennas 112, and user interface circuitry 114. In a non-limiting example, the control system 102 can be a field-programmable gate array (FPGA), as an example. In this regard, the control system 102 can include at least a microprocessor(s), an embedded memory circuit(s), and a communication bus interface(s). The receive circuitry 108 receives radio frequency signals via the antennas 112 and through the antenna switching circuitry 110 from one or more base stations. A low noise amplifier and a filter cooperate to amplify and remove broadband interference from the received signal for processing. Downconversion and digitization circuitry (not shown) will then downconvert the filtered, received signal to an intermediate or baseband frequency signal, which is then digitized into one or more digital streams using an analog-to-digital converter(s) (ADC).

The baseband processor 104 processes the digitized received signal to extract the information or data bits conveyed in the received signal. This processing typically comprises demodulation, decoding, and error correction operations, as will be discussed in greater detail below. The baseband processor 104 is generally implemented in one or more digital signal processors (DSPs) and application specific integrated circuits (ASICs).

For transmission, the baseband processor 104 receives digitized data, which may represent voice, data, or control information, from the control system 102, which it encodes for transmission. The encoded data is output to the transmit circuitry 106, where a digital-to-analog converter(s) (DAC) converts the digitally encoded data into an analog signal and a modulator modulates the analog signal onto a carrier signal that is at a desired transmit frequency or frequencies. A power amplifier will amplify the modulated carrier signal to a level appropriate for transmission, and deliver the modulated carrier signal to the antennas 112 through the antenna switching circuitry 110 to the antennas 112. The multiple antennas 112 and the replicated transmit and receive circuitries 106, 108 may provide spatial diversity. Modulation and processing details will be understood by those skilled in the art.

The self-organized mesh network 10 of FIG. 1 can operate based on a process. In this regard, FIG. 8 is a flowchart of an exemplary process 200 for operating the self-organized mesh network 10 of FIG. 1.

Herein, each of the coordinating nodes 14A, 14B, 140 is configured to transmit the ROM 38 and receive the RRM 40 from each of the wireless nodes 16 (step 202). The coordinating nodes 14A, 14B, 140 then determine the secure nodes $16A_S$, $16A_{SB}$, $16B_S$, $16B_{SB}$, $16C_{S1}$, and $16C_{S2}$ among the wireless nodes 16 based on the RRM 40 received from each of the wireless nodes 16 (step 204). More specifically, each of the coordinating nodes 14A, 14B, 140 first computes an expected distance and/or an expected position based on the RRM 40 and then determines the secure nodes $16A_S$, $16A_{SB}$, $16B_S$, $16B_{SB}$, $16C_{S1}$, and $16C_{S2}$ based on the expected distance and/or the expected position computed from the RRM 40. The coordinating nodes 14A, 14B, 140 then transmit the bridge capability inquiry 42 to the determined secure nodes $16A_S$, $16A_{SB}$, $16B_S$, $16B_{SB}$, $16C_{S1}$, and $16C_{S2}$ and receive the bridge capability response 44 from each of the secure nodes $16A_S$, $16A_{SB}$, $16B_S$, $16B_{SB}$, $16C_{S1}$, and $16C_{S2}$ (step 206). The coordinating nodes 14A, 14B, 140 then determine the secure bridge nodes $16A_{SB}$, $16B_{SB}$ among the secure nodes $16A_S$, $16A_{SB}$, $16B_S$, $16B_{SB}$, $16C_{S1}$, and $16C_{S2}$ based on the bridge capability response 46 received from each of the secure nodes $16A_S$, $16A_{SB}$, $16B_S$, $16B_{SB}$, $16C_{S1}$, and $16C_{S2}$ based on the bridge capability responses 44 (step 208).

Those skilled in the art will recognize improvements and modifications to the preferred embodiments of the present disclosure. All such improvements and modifications are considered within the scope of the concepts disclosed herein and the claims that follow.

What is claimed is:

1. A coordinating node of a node cluster in a self-organized mesh network, comprising a processing circuit configured to:
   transmit a ranging control message and receive a plurality of ranging response messages from a plurality of wireless nodes, respectively;
   determine one or more secure nodes among the plurality of wireless nodes based on the plurality of received ranging response messages;
   transmit a bridge capability inquiry to each of the one or more determined secure nodes and receive one or more bridge capability responses from the one or more determined secure nodes, respectively; and
   determine at least one secure bridge node among the one or more secure nodes based on the one or more received bridge capability responses.

2. The coordinating node of claim 1, wherein the processing circuit is further configured to:
   determine a respective distance and/or a respective angle-of-arrival, AoA, relative to each of the plurality of wireless nodes based on a respective one of the plurality of received ranging response messages; and
   determine that a respective one of the plurality of wireless nodes is among the one or more secure nodes when the respective distance is within an expected distance and/or the respective AoA is within an expected AoA.

3. The coordinating node of claim 1, wherein the processing circuit is further configured to:
receive the one or more bridge capability responses each comprising a bridge capability indication configured to indicate whether a respective one of the one or more secure nodes can provide a secure connection to an adjacent node cluster in the self-organized mesh network; and
determine the respective one of the one or more secure nodes as the at least one secure bridge node if the bridge capability indication in a respective one of the one or more bridge capability responses indicates that the respective one of the one or more secure nodes can provide the secure bridge to the adjacent node cluster.

4. The coordinating node of claim 3, wherein the processing circuit is further configured to detect an adjacent coordinating node in the adjacent node cluster through the determined at least one secure bridge node.

5. The coordinating node of claim 4, wherein the processing circuit is further configured to communicate with the detected adjacent coordinating node via the determined at least one secure bridge node to obtain a list of adjacent secure nodes in the adjacent node cluster.

6. The coordinating node of claim 5, wherein the processing circuit is further configured to communicate with the list of adjacent secure nodes in the adjacent node cluster via the determined at least one secure bridge node and the detected adjacent coordinating node.

7. The coordinating node of claim 3, wherein the processing circuit is further configured to detect a non-adjacent node cluster and a non-adjacent coordinating node of the non-adjacent node cluster through the determined at least one secure bridge node and the detected adjacent coordinating node.

8. The coordinating node of claim 7, wherein the processing circuit is further configured to obtain a list of non-adjacent secure nodes in the non-adjacent node cluster via the determined at least one secure bridge node, the detected adjacent coordinating node, and the detected non-adjacent coordinating node.

9. The coordinating node of claim 8, wherein the processing circuit is further configured to communicate with the list of non-adjacent secure nodes in the adjacent node cluster via the determined at least one secure bridge node, the detected adjacent coordinating node, and the detected non-adjacent coordinating node.

10. A self-organized mesh network comprising:
a plurality of node clusters each having a respective one of a plurality of coordinating nodes, wherein the respective one of the plurality of coordinating nodes comprises a processing circuit configured to:
transmit a ranging control message in the respective one of the plurality of node clusters and receive a plurality of ranging response messages from a plurality of wireless nodes, respectively;
determine one or more secure nodes among the plurality of wireless nodes based on the plurality of received ranging response messages;
transmit a bridge capability inquiry to each of the one or more determined secure nodes and receive one or more bridge capability responses from the one or more determined secure nodes, respectively; and
determine at least one secure bridge node among the one or more secure nodes based on the one or more received bridge capability responses.

11. The self-organized mesh network of claim 10 comprising a self-organized ultra-wideband, UWB, secure network.

12. The self-organized mesh network of claim 10, wherein the processing circuit is further configured to detect an adjacent coordinating node among the plurality of coordinating nodes in an adjacent node cluster among the plurality of node clusters through the determined at least one secure bridge node.

13. The self-organized mesh network of claim 12, wherein the processing circuit is further configured to communicate with the detected adjacent coordinating node via the determined at least one secure bridge node to obtain a list of adjacent secure nodes in the adjacent node cluster.

14. The self-organized mesh network of claim 13, wherein the processing circuit is further configured to communicate with the list of adjacent secure nodes in the adjacent node cluster via the determined at least one secure bridge node and the detected adjacent coordinating node.

15. The self-organized mesh network of claim 10, wherein the processing circuit is further configured to detect a non-adjacent coordinating node among the plurality of coordinating nodes in a non-adjacent node cluster among the plurality of node clusters through the determined at least one secure bridge node and the detected adjacent coordinating node.

16. The self-organized mesh network of claim 15, wherein the processing circuit is further configured to obtain a list of non-adjacent secure nodes in the non-adjacent node cluster via the determined at least one secure bridge node, the detected adjacent coordinating node, and the detected non-adjacent coordinating node.

17. The self-organized mesh network of claim 16, wherein the processing circuit is further configured to communicate with the list of non-adjacent secure nodes in the non-adjacent node cluster via the determined at least one secure bridge node, the detected adjacent coordinating node, and the detected non-adjacent coordinating node.

18. A method for operating a self-organized mesh network comprising:
transmitting a ranging control message and receiving a plurality of ranging response messages from a plurality of wireless nodes, respectively;
determining one or more secure nodes among the plurality of wireless nodes based on the plurality of received ranging response messages;
transmitting a bridge capability request to each of the one or more determined secure nodes and receiving one or more bridge capability responses from the one or more determined secure nodes, respectively; and
determining at least one secure bridge node among the one or more secure nodes based on the one or more received bridge capability responses.

19. The method of claim 18, further comprising:
detecting an adjacent coordinating node in an adjacent node cluster through the determined at least one secure bridge node;
communicating with the detected adjacent coordinating node via the determined at least one secure bridge node to obtain a list of adjacent secure nodes in the adjacent node cluster; and
communicating with the list of adjacent secure nodes in the adjacent node cluster via the determined at least one secure bridge node and the detected adjacent coordinating node.

20. The method of claim 18, further comprising:
detecting a non-adjacent node cluster and a non-adjacent coordinating node of the non-adjacent node cluster through the determined at least one secure bridge node and the detected adjacent coordinating node;
obtaining a list of non-adjacent secure nodes in the non-adjacent node cluster via the determined at least one secure bridge node, the detected adjacent coordinating node, and the detected non-adjacent coordinating node; and
communicating with the list of non-adjacent secure nodes in the non-adjacent node cluster via the determined at least one secure bridge node, the detected adjacent coordinating node, and the detected non-adjacent coordinating node.

21. The method of claim 18, further comprising:
determining a plurality of secure routes with any of the one or more secure nodes and each comprising the at least one secure bridge node; and
selecting one of the plurality of secure routes based on one or more of: a link quality, a desired reliability level, and a latency budget.

* * * * *